United States Patent [19]

Nakai

[11] Patent Number: 4,585,988
[45] Date of Patent: Apr. 29, 1986

[54] SWITCHING REGULATOR

[75] Inventor: Hideyuki Nakai, Higashiosaka, Japan

[73] Assignee: Sanyo Electric Co., Ltd., Osaka, Japan

[21] Appl. No.: 515,114

[22] Filed: Jul. 19, 1983

[30] Foreign Application Priority Data

Jul. 19, 1982 [JP] Japan ................. 57-126462

[51] Int. Cl.[4] ............................................... G05F 1/56
[52] U.S. Cl. ..................................... 323/285; 323/901
[58] Field of Search .............. 323/266, 285, 284, 288, 323/901, 908; 363/15, 23, 49

[56] References Cited

U.S. PATENT DOCUMENTS

| 3,721,836 | 3/1973 | Rippel | 323/284 |
|---|---|---|---|
| 4,034,281 | 7/1977 | Morita et al. | 363/124 |
| 4,118,739 | 10/1978 | Umehara | 358/190 |
| 4,207,516 | 6/1980 | Babcock | 323/908 |
| 4,274,034 | 6/1981 | Conklin | 323/288 |
| 4,307,440 | 12/1981 | Inoue et al. | 323/901 |
| 4,380,729 | 4/1983 | Kaku et al. | 323/285 |
| 4,464,710 | 8/1984 | Gruber | 323/901 |

Primary Examiner—Peter S. Wong
Assistant Examiner—Judson H. Jones
Attorney, Agent, or Firm—Armstrong, Nikaido, Marmelstein & Kubovcik

[57] ABSTRACT

A control transistor ($Q_2$) is connected between a base and an emitter of a switching transistor ($Q_1$) for by-passing a base current of the switching transistor ($Q_1$). In a transitional period immediately after application of an input voltage, a time-constant circuit ($R_8$, $R_9$, $R_{10}$, $R_{11}$, $C_4$), which is connected to a base of the control transistor ($Q_2$) through a diode ($D_5$), supplies the base of the control transistor ($Q_2$) with a voltage lower than the output voltage. Therefore, the control transistor ($Q_2$) is turned ON immediately after the application of the input voltage to by-pass the base current of the switching transistor ($Q_2$), whereby the switching transistor ($Q_1$) is forced to be turned OFF. The switching transistor ($Q_1$) is turned ON again by self-excitation and then is at once made to be turned OFF again by the effect of the time-constant circuit ($R_8$, $R_9$, $R_{10}$, $R_{11}$, $C_4$). Such operation is repeated until the voltage at the output point (B) is increased as large as a predetermined voltage value.

10 Claims, 6 Drawing Figures

SWITCHING REGULATOR

BACKGROUND OF THE INVENTION

1. Field of the Invention

This invention relates to a chopper-type switching regulator, and more specifically, to an improved switching regulator in its operation during transitional period being up to a stationary state after closing of a power switch.

2. Description of the Prior Art

Chopper-type switching regulators are classified into various types, one of which, for example, is of a step-down self-excited oscillating type as shown in FIG. 1.

Referring to FIG. 1, a rectifying-smoothing circuit composed of a diode $D_1$ and a capacitor $C_1$ is connected to a commercial alternating-current power supply. The rectifying-smoothing circuit includes a power switch $S_1$. A transformer T for blocking oscillation includes a primary coil $N_1$, a secondary coil $N_2$, and a feedback coil $N_3$. One end of the primary coil $N_1$ is connected to an output of the rectifying-smoothing circuit and the other end is connected to a collector of a switching transistor $Q_1$ through a soft-start switch $S_2$ having a current-limiting resistor $R_0$ connected in parallel therewith. A base of the switching transistor $Q_1$ is connected to one of the feedback coil $N_3$ through a resistor $R_2$ for limiting a positive feedback current and a capacitor $C_2$ for turning ON the switching transistor $Q_1$, and the other end of the feedback coil $N_3$ is connected to an emitter of the switching transistor $Q_1$, so that a positive feedback loop is composed. A diode $D_3$ for charging the capacitor $C_2$, the capacitor $C_2$, and the feedback coil $N_3$ compose a charging loop operating at the OFF period of the switching transistor $Q_1$. The secondary coil $N_2$ of the transformer T is connected to a flywheel diode $D_2$ for supplying the energy stored in the secondary coil $N_2$ to the output point B. A control transistor $Q_2$ for by-passing a base current (positive feedback current) of the switching transistor $Q_1$ has an emitter connected to the base of the transistor $Q_1$ and a collector connected to the emitter of the transistor $Q_1$, i.e. an output points B. A base of the transistor $Q_2$ is connected through a resistor $R_3$ to a collector of a detecting transistor $Q_3$ which detects the voltage variation at the output point B in cooperation with voltage-dividing resistors $R_5$–$R_7$ and a zener diode $D_4$. A base of the detecting transistor $Q_3$ is supplied with a divided voltage by the voltage-dividing resistors $R_5$–$R_7$ of the voltage at the output point B, and an emitter of the same is supplied with a constant voltage provided by a resistor $R_4$ and the zener diode $D_4$. A capacitor $C_3$ for smoothing the output voltage is connected to the output point B.

FIG. 2 indicates waveforms of voltages and currents at some points in the conventional chopper-type switching regulator as shown in FIG. 1. Referring now to FIG. 2, operation of the chopper-type switching regulator in FIG. 1 will be schematically described in the following. Here, let it be supposed that, in a stationary state where both the power switch $S_1$ and the soft start switch $S_2$ have been closed, the switching transistor $Q_1$ has been just turned OFF. Since the collector current of the switching transistor then is zero, no current passes through the primary coil $N_1$ of the transformer T. At this time, the transformer T has energy stored in it by the current passing through the switching transistor $Q_1$ during its previous ON period, and this energy is dissipated in the form of electric current flowing back from the secondary coil $N_2$ to the smoothing capacitor $C_3$ through the output point B and the flywheel diode $D_2$. At the same time, a current flows from the feedback coil $N_3$ through the charging diode $D_3$ to the capacitor $C_2$, whereby the capacitor $C_2$ is charged in the polarity as indicated in the drawing. When the dissipation of the energy stored in the transformer T is finished, namely at the time point when the current passing through the secondary coil $N_2$ has become almost zero, and accordingly the charging current to the capacitor $C_2$ has simultaneously become almost zero, the capacitor $C_2$ starts to discharge and this discharged current is applied through the resistor $R_2$ to the base of the switching transistor $Q_1$. As a result, the switching transistor $Q_1$ is turned ON, and its collector current starts to flow. The flowing of the collector current of the transistor $Q_1$ causes a positive feedback current supplied from the feedback coil $N_3$ to the base of the transistor $Q_1$ through the capacitor $C_2$ and the resistor $R_2$, hence the collector current of the transistor $Q_1$ increases almost linearly, and when the current value becomes $\beta$ times as large as the base current value limited by the resistor $R_2$ the switching transistor $Q_1$ is turned OFF again. The voltage across the coil $N_2$ during the ON period is $E_i - E_o$ when the turn ratio between the coils $N_1$ and $N_2$ is 1:1.

In regard to the switching operation of the switching transistor $Q_1$ being performed as described above, the relation of the output voltage $E_o$ (the voltage at B) and the input voltage $E_i$ (the voltage at A) is given by:

$$E_o = T_n/T \cdot E_i,$$

where T is the switching period and $T_n$ is the ON period. The output voltage $E_o$ at the point B thus determined is divided by the voltage dividing resistors $R_5$–$R_7$ and then applied to the base of the detecting transistor $Q_3$. If and when the output voltage $E_o$ varies, its variation causes variation in the base voltage of the transistor $Q_3$, which in turn causes variation in the collector current of the transistor $Q_3$, that is, the base current of the transistor $Q_2$. With the variation in the base current of the control transistor $Q_2$, the emitter current of the transistor $Q_2$, that is the by-pass amount of the base current of the switching transistor $Q_1$, varies, and in consequence, the ON period $T_n$ of the switching transistor $Q_1$ is controlled. Then the output voltage $E_o$ is controlled according to the above equation, and thus the voltage stabilizing operation is performed.

Next, the case of a transitional period, that is, the state immediately after the closing of the power switch $S_1$ will be considered in the following. First, it will be assumed that the soft-start switch $S_2$ and the resistor $R_0$ are not inserted in the circuit in FIG. 1. When the power switch is closed, a current is applied to the base of the switching transistor $Q_1$ through a starting resistor $R_1$ allowing a slight collector current to flow. Hence, a current flows through the primary coil $N_1$ of the transformer T, which induces an current flowing through the feedback coil $N_3$, that is, the positive feedback current, which is applied to the base of the switching transistor $Q_1$. At this time, namely, immediately after the closing of the power switch, both the detecting transistor $Q_3$ and the control transistor $Q_2$ are OFF, and therefore all of the above-mentioned positive feedback current flows as the base current of the switching transistor $Q_1$ through the resistor $R_2$. Hence, this transistor $Q_1$ will remain ON and its collector current will increase approximately linearly until either the collector current becomes $\beta$ times as large as the above-mentioned base current or the capacitor $C_2$ is fully charged in the polarity reverse to that as shown in the drawing. Hence, there is the possibility under such transitional conditions that a large collector current flows through the switching transistor $Q_1$, which current causing the transistor $Q_1$ to be operated beyond its safety range of use and to be broken down. Therefore, the soft-start switch $S_2$ and the resistor $R_0$ have been provided in the circuit as shown in FIG. 1, wherein it is arranged that the switch $S_2$ is open when the power switch $S_1$ is closed so that the collector current flowing through the switching transistor $Q_1$ is limited by the above-mentioned resistor $R_0$, and the switch $S_2$ is closed after the output voltage $E_o$ at the point B has reached a sufficiently high value.

However, if the above-mentioned switch $S_2$ is to be opened and closed by hand, two times of switching operation becomes necessary including that for the power switch $S_1$, and this certainly is inconvenient. The above-mentioned switch $S_2$ may be a relay or the like that is able to be automatically closed in response to detecting the increase in the above-mentioned output voltage $E_o$, which however, involves the defect that the circuit will become rather complicated.

SUMMARY OF THE INVENTION

The present invention is directed to a switching regulator for switching an input voltage produced by rectifying and smoothing of alternating-current power for providing a constant direct-current output voltage. The switching regulator in accordance with the present invention comprises a switching transistor for switching said input voltage applied thereto for providing a switching output of said input voltage; means for applying a base current to the base of said switching transistor for periodically turning ON/OFF said switching transistor; a smoothing capacitor for smoothing said switching output for providing said direct-current output voltage; by-passing means operatively connected to said switching transistor for by-passing the base current of said switching transistor for controlling an ON period of said switching transistor; means receiving said direct-current output voltage obtained by said smoothing capacitor for providing said by-passing means in response to said direct-current output voltage with a first control voltage for controlling said by-passing means so that in a stationary state of said switching regulator said direct-current output voltage is maintained at a predetermined constant value; and a time-constant circuit for applying to said by-passing means a second control voltage being lower than said direct-current output voltage during a transitional period immediately after application of said input voltage to control said by-passing means so that said ON period of said switching transistor is shortened during said transitional period.

Accordingly, the major object of the present invention is to provide an improved switching regulator in its operation in the transitional conditions during the interval after closing of the power switch up to the stationary state.

Another object of the present invention is to provide a switching regulator capable of supplying a stable output voltage irrespective of variation in the input voltage.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
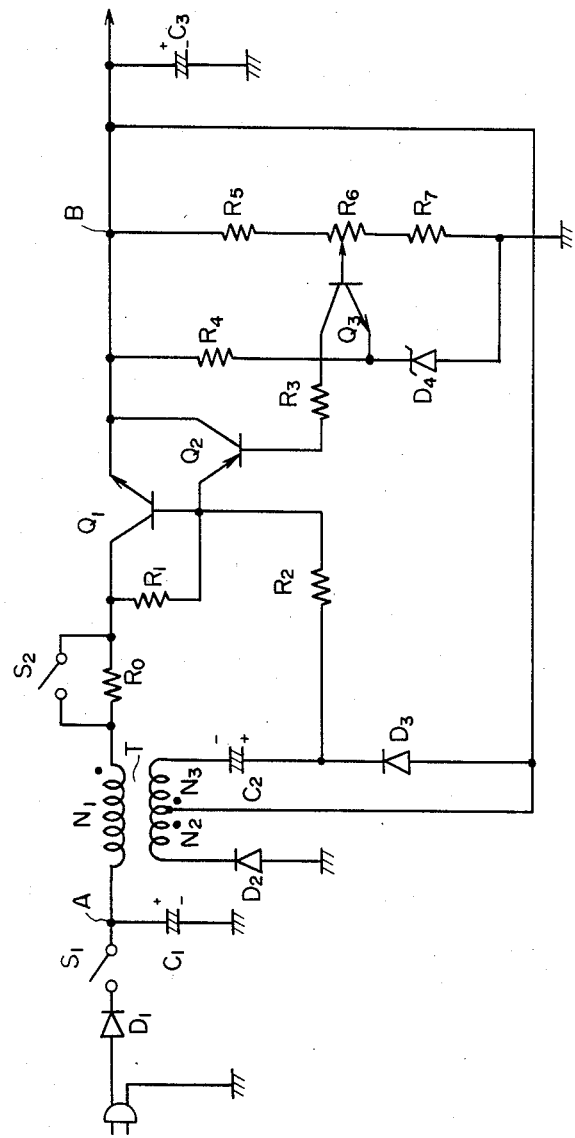
FIG. 1 is a circuit diagram showing a conventional chopper-type switching regulator of stepdown self-excited oscillating type.
Figure 2:
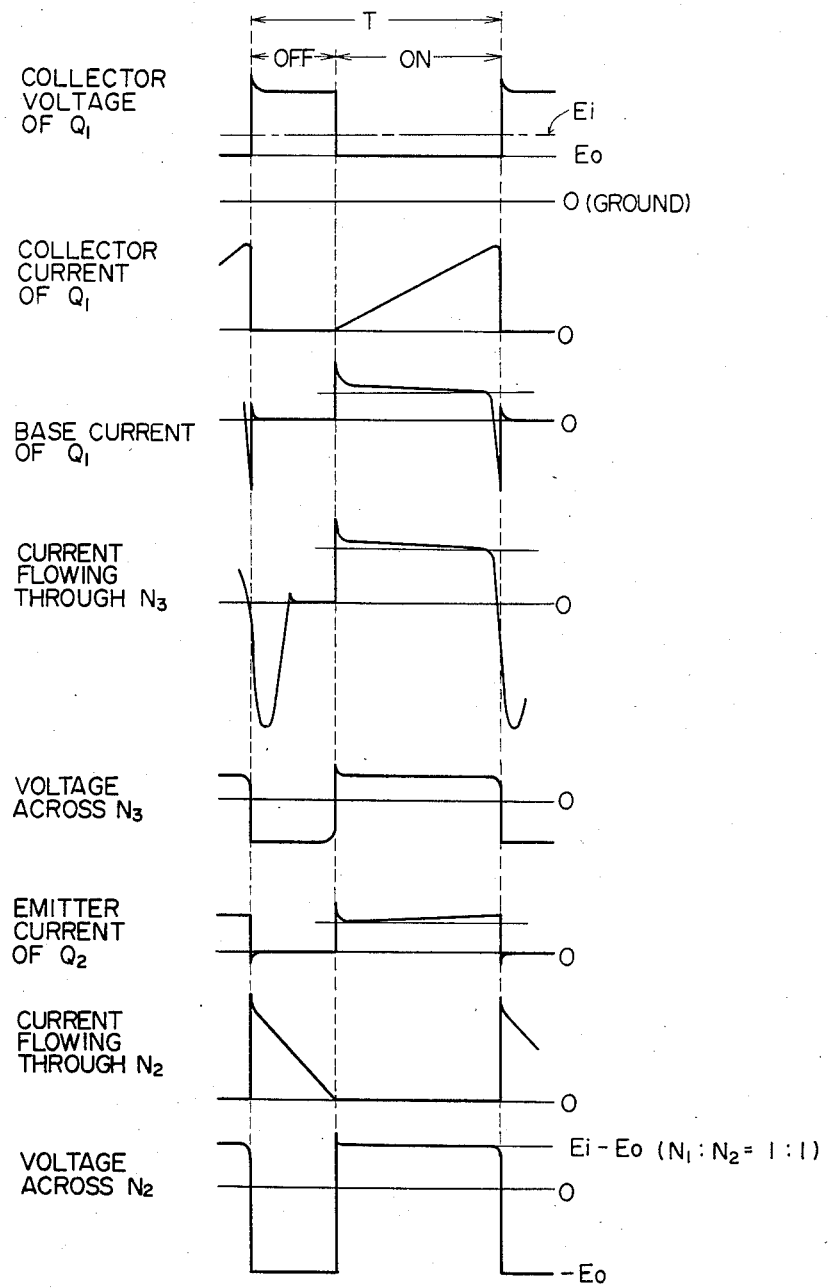
FIG. 2 is a chart indicating the voltage and current waveforms at some points in the circuit as shown in FIG. 1.
Figure 3:
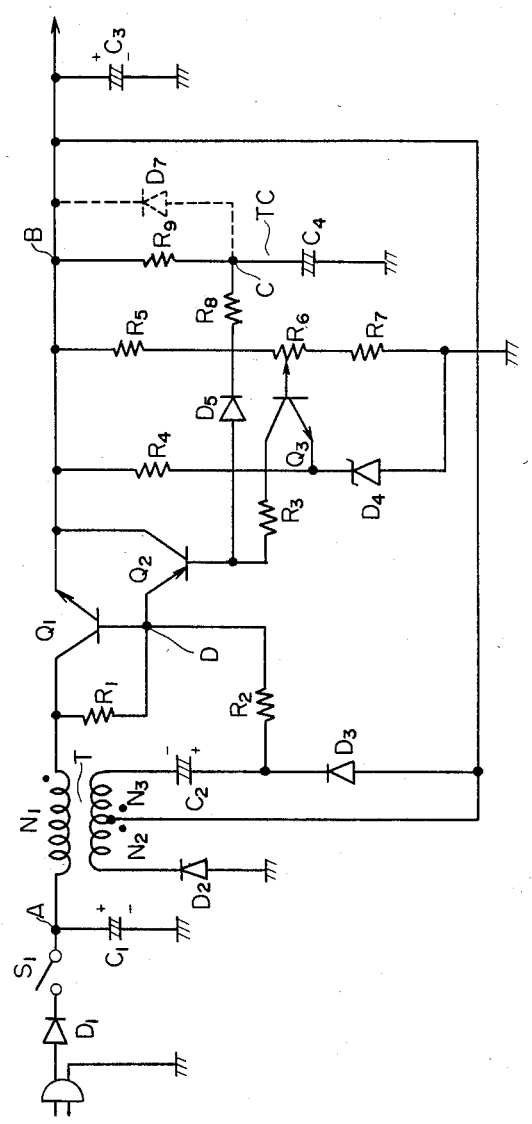
FIG. 3 is a circuit diagram showing a preferred embodiment of the chopper-type switching regulator in accordance with the present invention.

FIG. 3 shows a preferred embodiment of the chopper-type switching regulator in accordance with the present invention, wherein corresponding parts to those in FIG. 1 are denoted by like reference characters and description of such parts is omitted here; the characteristics of this embodiment are as shown in the following. In the embodiment, a time-constant circuit TC composed of resistors $R_8$ and $R_9$ and a capacitor $C_4$ is connected to the point B, and a switching diode $D_5$ is coupled between one end of the resistor 8 and the base of the control transistor $Q_2$ in the direction as indicated in the diagram.

In such an embodiment, when the collector current of the switching transistor $Q_1$ starts to flow immediately after the closing of the power switch, some value of output voltage is generated at the point B, but the voltage of the point C does not at once become identical to the voltage at the point B due to time-constant of the time-constant circuit TC. The voltage at the point D is higher than the voltage at the point B by the base-emitter voltage of the switching transistor $Q_1$. Therefore, the voltage between the points C and D is sufficiently higher than the sum of the base-emitter voltage $V_{BE}$ of the control transistor $Q_2$ and the threshold voltage $V_d$ of the switching diode $D_5$ ($V_{BE}+V_D$) that is required for turning ON both the transistor $Q_2$ and the diode $D_5$, and therefore the control transistor $Q_2$ and the switching diode $D_5$ are turned ON. When the control transistor $Q_2$ is turned ON, the positive feedback current supplied from the feedback coil $N_3$ to the base of the switching transistor $Q_1$ becomes to be by-passed through the emitter-collector of the control transistor $Q_2$. Thus, at the time point when a slight amount of the collector current of the switching transistor $Q_1$ flows subsequent to the closing of the power switch, this collector current becomes $\beta$ times as large as the base current of the switching transistor $Q_1$, so that the switching transistor $Q_1$ turns OFF at this time point. Thereafter, the transistor $Q_1$ returns to an ON state through the same process as in the above described stationary state in the conventional switching regulator shown in FIG. 1. The voltage at the point C is now a little higher than that in the foregoing case, and therefore, the current flowing through the switching diode $D_5$, that is, the base current of the control transistor $Q_2$, becomes a little smaller than that in the foregoing case. Therefore, the emitter current of this transistor $Q_2$, that is, the by-passing current of the base current of the switching transistor $Q_1$, also decreases a little. Thus, in this case, the ON period $T_n$ continuing until the switching transistor $Q_1$ is turned OFF again becomes a little longer than that in the foregoing case. Such a process is then repeated several times so that the voltage at the points B and C increase gradually. When the voltages at the points B and C reach the predetermined output voltage value, the switching diode $D_5$ is turned OFF and the detecting transistor $Q_3$ is turned ON, and thus the operation thereafter becomes the same as in the stationary state in the switching regulator of FIG. 1.

In the above described circuit, the voltage at the point C is increased as the capacitor $C_4$ is charged by both the current flowing thereto from the point B through the resistor $R_9$ and the current flowing thereto through the switching diode $D_5$ and the resistor $R_8$. Using a diode $D_7$ as indicated by the dotted line in FIG. 3 in place of the resistor $R_9$, it is possible to have the voltage at the point C increased by charging the capacitor $C_4$ only by the last mentioned current of the two in the foregoing. Since this diode $D_7$ can serve for discharging of the capacitor $C_4$, in this case, the capacitor $C_4$ is discharged faster through the diode $D_7$ at the time of the opening of the power switch $S_1$. Therefore, a soft-start operation as earlier described is certainly carried out even when the power switch $S_1$ is closed immediately after it is opened.

In the circuit in FIG. 3, there arises a problem as follows in the case where the input voltage $E_i$ decreases below the range of voltage regulation. More specifically, in such a case, the output voltage at the point B decreases far below the predetermined voltage $E_o$ so that the detecting transistor $Q_3$ is held at OFF state and the base current of the control transistor $Q_2$ does not flow, and hence this transistor $Q_2$ is held at OFF state. As a result, during the ON period $T_n$ of the switching transistor $Q_1$, all of the positive feedback current from the feedback coil $N_3$ flows as the base current of the switching transistor $Q_1$. Therefore, under such conditions, the ON period $T_n$ of the switching transistor $Q_1$ does not vary even if the input voltage $E_i$ varies, and thus ripples of the input voltage $E_i$ appears directly at the point B.

Figure 4:
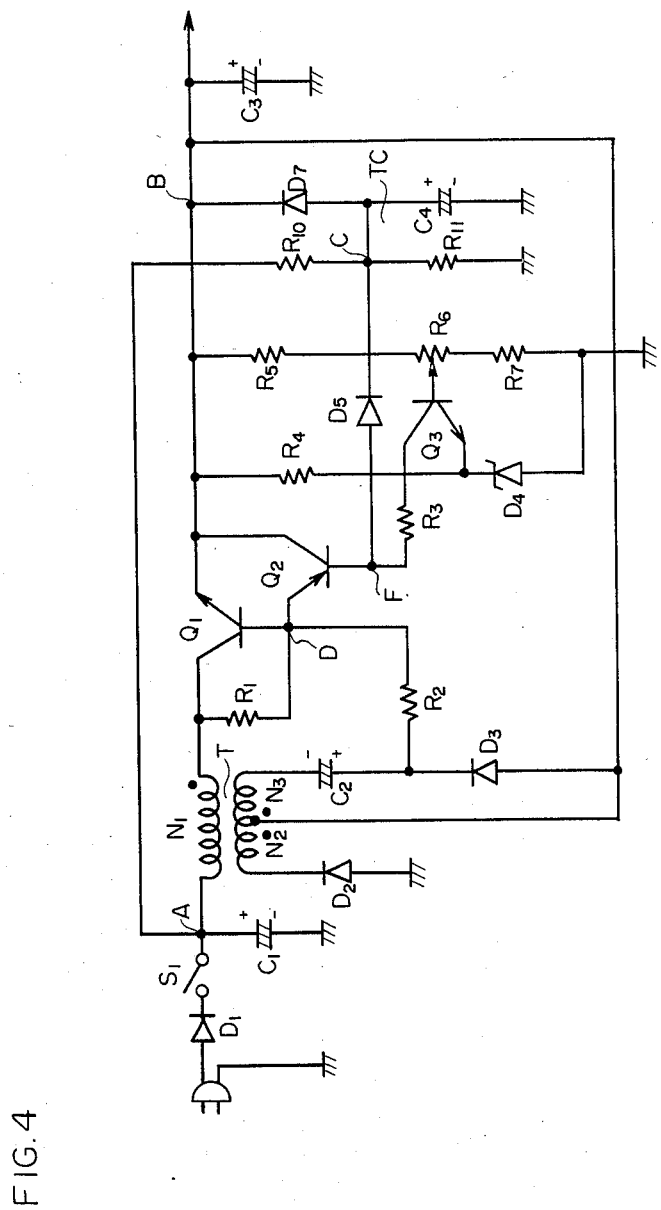
FIG. 4 is a circuit diagram showing another preferred embodiment of the chopper-type switching regulator in accordance with the present invention.

FIG. 4 shows another preferred embodiment of the present invention wherein the above-mentioned problem is overcome. In this embodiment, the time-constant circuit is composed of the resistors $R_{10}$ and $R_{11}$ to divide the input voltage $E_i$ at the point A, a capacitor $C_4$, and the diode $D_7$ being the same as that described in the foregoing. It is to be noted that the value of the dividing resistors $R_{10}$ and $R_{11}$ are selected so that the voltage at the point C in the stationary state is equal to or a little higher than the output voltage $E_o$ at the point B.

In such an embodiment, since the voltage at the point F does not become higher than the output voltage $E_o$ (the voltage at the point F becomes approximately $E_o$ when the transistors $Q_1$ and $Q_2$ are ON), the switching diode $D_5$ is always OFF wherever the input voltage $E_i$ is within the range of voltage regulation. Therefore, in this case, the operation during the transitional period between closing of the power switch and the stationary state and the voltage regulating operation in the stationary state are performed quite the same as those in the embodiment shown in FIG. 3. If and when the input voltage $E_i$ decreases below the range of voltage regulation in the stationary state, the voltage at the point C becomes lower than the voltage at the point B, i.e. that of the point F. Therefore, the switching diode $D_5$ and the control transistor $Q_2$ are turned ON as the switching transistor $Q_1$ is turned ON. The base current of the control transistor $Q_2$ passes through the diode $D_5$ since the detecting transistor $Q_3$ is "OFF". As the current passing through the diode $D_5$ varies depending upon the voltage at the point C, the emitter current of the control transistor $Q_2$, that is the by-passing current of the base current of the switching transistor $Q_1$, is controlled in response to the average value of the input voltage $E_i$ at the point A.

For example, when the input voltage $E_i$ decreases, the base current of the control transistor $Q_2$ increases and the above mentioned by-passing current also increases, and therefore, the ON period $T_n$ of the switching transistor $Q_1$ becomes shorter and the output voltage at the point B is decreased. On the other hand, in the case where the input voltage $E_i$ increases, the above mentioned output voltage is contrariwise increased.

Thus, in the embodiment, since the voltage dependent on the voltage at the point C is taken out at the point B, such output voltage substantially free from ripples, though not of constant voltage value, is obtained at the point B by making ripples at the point C fully removed by the capacitor $C_4$.

Figure 5:
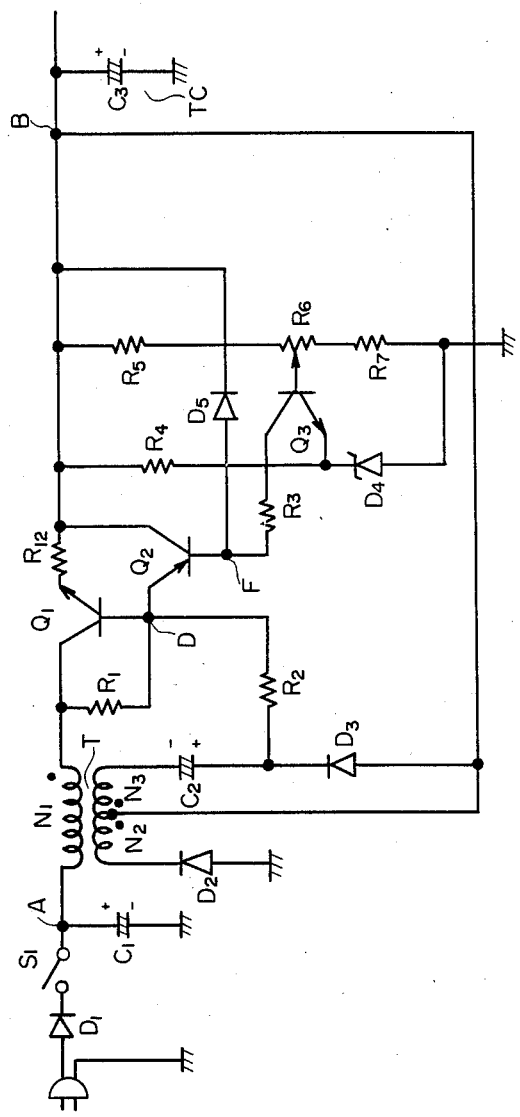
FIG. 5 is a circuit diagram showing a further preferred embodiment in accordance with the chopper-type switching regulator in accordance with the present invention.

FIG. 5 shows a circuit diagram of a further preferred embodiment of the switching regulator in accordance with the present invention. This embodiment is characterized in that the smoothing capacitor $C_3$ for the output voltage $E_o$ is also used for a time-constant circuit. The switching diode $D_5$ is connected between the base of the switching transistor $Q_2$ and the output point B, and a low-value resistor $R_{12}$ is coupled between the collector of the switching transistor $Q_1$ and the output point B. When the power switch $S_1$ is closed, the switching transistor $Q_1$ is turned ON to slightly increase the voltage at the output point B as earlier described. Since the potential difference between the points D and B at this time is higher than the case where the resistor $R_{12}$ is not provided there by the value of the voltage arising across the resistor $R_{12}$, both the control transistor $Q_2$ and the switching diode $D_5$ are turned ON. Therefore, the base current of the switching transistor $Q_1$ is by-passed by the control transistor $Q_2$ and the switching transistor $Q_1$ is thus turned OFF again after only small collector current has passed. Thereafter, the switching transistor $Q_1$ repeat ON/OFF operation to settle to a stationary state in the same way as in the above described embodiment in FIG. 3.

Figure 6:
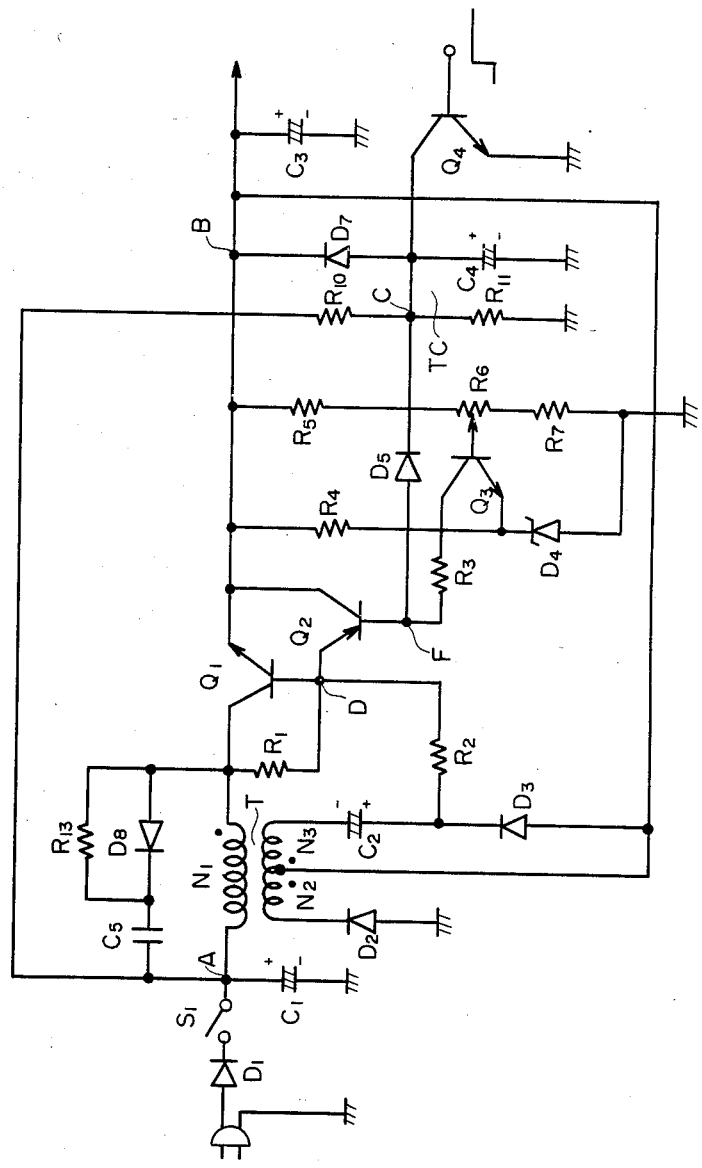
FIG. 6 is a circuit diagram showing a still further preferred embodiment of the chopper-type switching regulator in accordance with the present invention.

FIG. 6 is a circuit diagram showing a still further preferred embodiment of the switching regulator in accordance with the present invention. In this embodiment, the above described embodiment in FIG. 4 is further improved and the difference from the embodiment in FIG. 4 is as shown in the following. More specifically, a switching transistor $Q_4$ is provided so that the resistor $R_{11}$ of the voltage dividing resistors $R_{10}$ and $R_{11}$ is connected in parallel therewith across the collector-emitter thereof. An energy absorbing circuit composed of a capacitor $C_5$, a resistor $R_{13}$, and a diode $D_8$ is provided in parallel connection with the primary coil $N_1$ of the transformer T. The energy absorbing circuit is constructed by connecting the capacitor $C_5$ in series with the parallel connection of the resistor $R_{13}$ and the diode $D_8$.

A switching signal is supplied to the base of the switching transistor $Q_4$ so that the ON/OFF state of the switching transistor $Q_4$ is controlled. When the switching transistor $Q_4$ is in ON state, the control transistor $Q_2$ is held at ON (saturated) state, and the switching transistor $Q_1$ is held at OFF state since its base current is wholly by-passed by the transistor $Q_2$. Therefore, the switching regulator does not operate. When the switching transistor $Q_4$ is in OFF state, the operation is the same as in the embodiment as shown in FIG. 4. Since, in the present embodiment, enabling/disabling of the switching regulator can be controlled by applying the switching signal to the switching transistor $Q_4$ to turn it ON/OFF, this embodiment is particularly suitable for the case where the on/off of a power source (that is, of the output of the switching regulator) is to be remotely controlled.

The energy absorbing circuit connected in parallel with the primary coil $N_1$ of the transformer T absorbs quickly the energy stored in the primary coil $N_1$ during the ON period at the instant the switching transistor $Q_1$ has been turned from ON to OFF, thus preventing the switching transistor $Q_1$ from application of a momentary high voltage. This well-known energy absorbing circuit is provided for the practical purpose to protect the switching transistor $Q_1$ from breaking down.

While there have been described embodiments of the invention as applied to the self-excited oscillating type wherein a switching transistor is turned ON/OFF by blocking oscillation, the invention is also applicable to the external oscillating type wherein a driving current is periodically supplied from an external oscillator or the like to the base of a switching transistor for driving the switching transistor.

As described in the foregoing, the switching regulator in accordance with the present invention is arranged so that the ON periods of the switching transistor are gradually increased after closing of the power switch to a stationary state, and therefore, it does not occur that a large current flows into the switching transistor to cause a breakdown of it during the transitional period before the stationary state, and furthermore, such a switching regulator is realized economically in a very simple circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A switching regulator for switching an input voltage obtained by rectifying and smoothing of alternating-current power for providing a constant direct-current output voltage, comprising:
   a transformer having at least a primary input winding and a feedback winding electromagnetically coupled to said input winding;
   a switching transistor having a collector-emitter path and a base for switching said input voltage applied thereto for providing a switching output of said input voltage;
   said input winding and said collector-emitter path of said switching transistor being connected in series between said input voltage and an output node;
   said base of said switching transistor being operatively connected to one end of said feedback winding of said transformer for applying a base current to said base for periodically turning ON/OFF said switching transistor;
   a smoothing capacitor connected to said output node for smoothing said switching output for providing said direct-current output voltage;
   by-passing means operatively connected to said base of said switching transistor for by-passing the base current of said switching transistor for controlling an ON period of said switching transistor;
   first means receiving said direct-current output voltage obtained by said smoothing capacitor for providing said by-passing means in response to said direct-current output voltage with a first control voltage for controlling said by-passing means so that in a stationary state of said switching regulator said direct-current output voltage is maintained at a predetermined constant value;
   second means having a time-constant circuit for applying to said by-passing means a second control voltage being lower than said direct-current output voltage during a transitional period immediately after application of said input voltage to control said by-passing means so that said ON period of said switching transistor is shortened during said transitional period; and
   input sensing means having a dividing resistor, one end of which is connected to the input side of said primary input winding, for sensing said input voltage and applying to said time-constant circuit the sensed input voltage on the dividing point of said dividing resistor, and
   said second means providing said by-passing means in response to said sensed input voltage with a third control voltage being proportional to said input voltage and lower than said predetermined constant value of said direct-current output voltage when said input voltage decreases below the range of voltage regulation in said stationary state so that said switching transistor is ON-OFF controlled in response to said input voltage.

2. A switching regulator in accordance with claim 1, wherein
   said by-passing means includes a control transistor, to which said first and second control voltages are applied, for by-passing the base current of said switching transistor through the emitter-collector thereof in response to said first and second control voltage, and which further comprises
   a first diode connected between the base of said control transistor and said time-constant circuit.

3. A switching regulator in accordance with claim 2, wherein
   said time-constant circuit is connected to an output node of said direct-current output voltage.

4. A switching regulator in accordance with claim 3, wherein
   said time-constant circuit includes a first resistor connected to said node, a second resistor connected to said first diode, and a capacitor connected to both of said first and second resistors.

5. A switching regulator in accordance with claim 3, wherein
   said time-constant circuit includes a second diode connected to said node, a third resistor connected to said first diode, and a capacitor connected to both of said second diode and said third resistor.

6. A switching regulator in accordance with claim 2, wherein
said time-constant circuit includes a voltage dividing resistor for dividing said input voltage and a capacitor connected to a voltage dividing point of said voltage dividing resistor, and said first diode is connected to said voltage dividing point.

7. A switching regulator in accordance with claim 6, wherein
said time-constant circuit further includes a diode connected between the output node of said direct-current output voltage and said voltage dividing point.

8. A switching regulator in accordance with claim 2, wherein
said time-constant circuit is adapted to concurrently serve as said smoothing capacitor, and said first diode is directly connected to the output node of said direct-current output voltage, and which further comprises
a resistor connected between said switching transistor and the output node of said direct-current output voltage.

9. A switching regulator in accordance with claim 7, wherein
said time-constant circuit further includes a transistor connected between said voltage dividing point and a ground,
the base of said transistor being supplied with a switching signal for turning on/off said switching regulator output.

10. A switching regulator in accordance with claim 9, wherein
said switching signal is applied in a remote controlled manner.

* * * * *